United States Patent
Mishra et al.

(10) Patent No.: US 9,747,244 B2
(45) Date of Patent: Aug. 29, 2017

(54) CLOCKLESS VIRTUAL GPIO

(71) Applicant: QUALCOMM Incorporated, San Diego, CA (US)

(72) Inventors: Lalan Jee Mishra, San Diego, CA (US); Richard Dominic Wietfeldt, San Diego, CA (US); Mohit Kishore Prasad, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 421 days.

(21) Appl. No.: 14/540,366

(22) Filed: Nov. 13, 2014

(65) Prior Publication Data

US 2015/0149672 A1 May 28, 2015

Related U.S. Application Data

(60) Provisional application No. 61/907,974, filed on Nov. 22, 2013.

(51) Int. Cl.
G06F 13/12 (2006.01)
G06F 13/42 (2006.01)
G06F 9/455 (2006.01)

(52) U.S. Cl.
CPC ...... *G06F 13/4221* (2013.01); *G06F 9/45533* (2013.01); *G06F 13/4273* (2013.01)

(58) Field of Classification Search
CPC ........... G06F 13/40; G06F 13/14; G06F 13/00
USPC ........................................................ 710/106
See application file for complete search history.

(56) References Cited

U.S. PATENT DOCUMENTS

| 6,020,760 | A | 2/2000 | Sample et al. |
| 6,370,603 | B1 * | 4/2002 | Silverman ............. G06F 13/385 709/220 |
| 6,990,549 | B2 * | 1/2006 | Main ................... G06F 13/4045 361/679.4 |
| 8,046,511 | B2 | 10/2011 | Jackson et al. |
| 9,197,157 | B1 * | 11/2015 | Lin ......................... H03B 5/36 |
| 2003/0061431 | A1 | 3/2003 | Mears et al. |
| 2007/0226795 | A1 * | 9/2007 | Conti ...................... G06F 21/74 726/22 |
| 2009/0037621 | A1 | 2/2009 | Boomer et al. |
| 2012/0072628 | A1 * | 3/2012 | Crockett ............. G06F 13/4291 710/110 |
| 2013/0080677 | A1 | 3/2013 | Simmons |
| 2013/0111099 | A1 * | 5/2013 | Nie ..................... G06F 15/7867 710/307 |
| 2013/0187708 | A1 | 7/2013 | Dang et al. |
| 2013/0268712 | A1 | 10/2013 | Ajanovic et al. |

FOREIGN PATENT DOCUMENTS

| DE | 19605643 A1 | 2/1997 |
| EP | 0983562 A1 | 3/2000 |
| EP | 2330514 A1 | 6/2011 |

OTHER PUBLICATIONS

International Search Report and Written Opinion—PCT/US2015/012535—ISA/EPO—dated Apr. 23, 2015.

* cited by examiner

*Primary Examiner* — Titus Wong
(74) *Attorney, Agent, or Firm* — Haynes and Boone, LLP (57) ABSTRACT

A virtual GPIO architecture for an integrated circuit is provided that both serializes virtual GPIO signals and deserializes virtual GPIO signals without the need for an external clock.

20 Claims, 6 Drawing Sheets

CLOCKLESS VIRTUAL GPIO

RELATED APPLICATION

This application claims the benefit of U.S. Provisional Application No. 61/907,974, filed Nov. 22, 2013, the contents of which are incorporated by reference herein in their entirety.

TECHNICAL FIELD

This application relates to general purpose input/output (GPIO), and more particularly to an integrated circuit configured to use a pair of pins as virtual GPIO pins.

BACKGROUND

General purpose input/output (GPIO) enables an integrated circuit designer to provide generic pins that may be customized for particular applications. For example, a GPIO pin is programmable to be either an output or an input pin depending upon a user's needs. A GPIO module or peripheral will typically control groups of pins which can vary based on the interface requirement. Because of the programmability of GPIO pins, they are commonly included in microprocessor and microcontroller applications. For example, an applications processor in mobile devices may use a number of GPIO pins to conduct handshake signaling such as inter-processor communication (IPC) with a modem processor.

With regard to such handshake signaling, a sideband signal is deemed as "symmetric" if it must be both transmitted and received by a processor. If there are n symmetric sideband signals that need to be exchanged, each processor requires n*2 GPIO pins (one GPIO pin to transmit a given signal and one GPIO pin to receive that signal). For example, a symmetric IPC interface between a modem processor and an application processor may comprise five signals, which translates to 10 GPIO pins being necessary for the resulting IPC signaling. The need for so many GPIO pins for IPC communication increases manufacturing cost. Moreover, devoting too many GPIOs for IPC limits the GPIO availability for other system-level peripheral interfaces. The problem cannot be solved by moving the IPC communication onto the main data bus between the processors in that certain corner conditions may then be violated.

Accordingly, there is a need in the art for a GPIO architecture that can accommodate numerous input/output signals without requiring an excessive number of pins.

SUMMARY

A virtual GPIO architecture is provided for communication between two integrated circuits each having a processor. Each integrated circuit also includes a GPIO interface for communicating with the other integrated circuit's processor using a set of signals. This set of signals comprises a set of GPIO signals and a set of virtual GPIO signals. Each integrated circuit thus includes a set of GPIO pins corresponding to the set of GPIO signals.

In contrast to the set of GPIO signals, the set of virtual GPIO signals are not transmitted over GPIO pins. Instead, each integrated circuit transmits and receives the set of virtual GPIO signals using a dedicated transmit pin and a dedicated receive pin, respectively. In that regard, the set of virtual GPIO signals comprises a transmit set and a receive set. A finite state machine (FSM) in each integrated circuit is configured to serially transmit the transmit set to the remote processor through the dedicated transmit pin. The finite state machine is further configured to serially receive the receive set of virtual GPIO signals from the remote processor over the dedicated receive pin.

To eliminate any need for reserving a pin in each integrated circuit for receiving a common clock, no common clock is necessary to coordinate the transmission of a transmit set from one processor for receipt as a receive set at another processor. The transmission and reception is thus asynchronous with regard to the transmitting integrated circuit and the receiving integrated circuit. To enable this advantageous asynchronous transmission and reception, each FSM includes or associates with an oscillator such as a ring oscillator. The transmitting FSM pulse-width modulates the transmitted signal over the dedicated transmit pin responsive to each bit in the transmit set by counting the oscillations from the oscillator. The bits in the transmit set are then transmitted in frames of data, each bit in the frame being a pulse-width-modulated version of the corresponding bit in the transmit set. Each bit in the transmitted frame of data has a certain bit period that is used with respect to the pulse-width modulation. For example, if a transmit bit has one binary state such as a binary zero, the FSM may count a first number of oscillations so that a majority fraction of the bit period has expired. Upon counting the first number of oscillations, the FSM pulses the dedicated transmit pin with a first binary voltage such as with a power supply voltage VDD. At the start of the count, the dedicated transmit pin is pulsed in an opposite second binary voltage state such as ground.

Conversely, if a transmit bit has an opposite binary state such as a binary one, the FSM may count a second number of oscillations so that a minority fraction of the bit period has expired. Upon counting the second number of oscillations, the FSM pulses the dedicated transmit pin with the first binary voltage. In this fashion, the voltage of the transmit line coupled to the dedicated transmit pin is pulsed with the first binary voltage according to a variable pulse width. If the current transmit bit has a first binary value, the transmit line is pulsed with the first binary voltage according to a first pulse width. Conversely, if the current transmit bit has an opposite second binary value, the transmit line is pulsed with the first binary voltage according to a second pulse width.

The receipt at an FSM over its dedicated receive pin of a transmitted frame of data from a remote processor is demodulated in an analogous fashion. It is convenient for the default state (or idle mode) of each transmit line (which is the receive line for a receiving processor) to be charged to a power supply voltage VDD. This makes the health of the remote processor transparent to the receiving processor as discussed further below. The second binary voltage in such embodiments would then be ground. The receiving FSM would then recognize the start of a received bit by detecting when the dedicated receive pin is discharged. The receiving FSM may then begin counting oscillations from its oscillator. Two counts would then be generated: a first receive count of how many oscillations occur during the bit fraction in which the dedicated receive pin is charged to the first binary voltage, and a second receive count of how many oscillations occur during the bit fraction in which the dedicated receive pin is charged to the second binary voltage. By comparing the two receive counts, the receiving FSM may determine whether the first pulse width or the second pulse width was applied to the received bit. The received frame of data is demodulated accordingly such that no common clock is required to coordinate the transmission of the frames of data over the transmit lines.

BRIEF DESCRIPTION OF THE DRAWINGS

Embodiments of the present disclosure and their advantages are best understood by referring to the detailed description that follows. It should be appreciated that like reference numerals are used to identify like elements illustrated in one or more of the figures.

DETAILED DESCRIPTION

A virtual general purpose input/output (GPIO) architecture is provided that enables an integrated circuit to use a pair of pins as if they constituted a larger plurality of GPIO pins. This architecture is deemed virtual in that, to the system-level applications creating the signals for transmission as virtual GPIO signals through a virtual GPIO interface within the architecture, it is as if the virtual GPIO signals were being transmitted and received on conventional GPIO pins. A system on chip (SOC) or processor having the virtual GPIO architecture disclosed herein thus experiences no functional difference between conventional GPIO signals and virtual GPIO signals. This is advantageous in that the processor needs no new configuration or programming to function with the virtual GPIO interface. However, the virtual GPIO interface uses only two pins to transmit and receive the virtual GPIO signals that would otherwise each need their own dedicated GPIO pin.

This architecture will be discussed with regard to accommodating IPC between an applications processor and a modem processor. However, it will be appreciated that the virtual GPIO circuits and techniques disclosed herein are widely applicable to other SOCs or application specific integrated circuits (ASICs) requiring GPIO capabilities.

As will be explained further herein, the disclosed virtual GPIO architecture makes the health of the transmitting node transparent to the receiving node. This is an important advantage, particularly during the debugging stage for software implementations as it indicates to the receiving processor the time that a transmitting processor became inoperative.

To enable such a robust virtual GPIO capability, each processor in the transmitting and receiving integrated circuits communicates through a dedicated transmit pin coupled to a transmit line and a dedicated receive pin coupled to a receive line. The transmit line for a transmitting integrated circuit becomes the receive line for a receiving integrated circuit. The virtual GPIO signals may be divided into a transmit set for transmission over the transmit line and a receive set for reception on the receive line. If the signaling is symmetric, the number of signals in the transmit set and the receive set for each processor is the same. However, the virtual GPIO architecture disclosed herein can accommodate asymmetric signaling in which the transmit set of virtual GPIO signals for one processor is not the same size as the receive set for the same processor.

Each integrated circuit pulse-width modulates the transmit set of virtual GPIO signals into data frames for transmission to another integrated circuit. Each bit in the data frame corresponds to a bit in the transmit set of signals. Control of the pulse width modulation may be performed by a finite state machine (FSM). Each transmitted bit in a data frame is represented by a voltage pulse on the transmit line within a bit period. A first pulse width signifies one binary value for the transmitted bit whereas a second pulse width signifies another binary value for the transmitted bit. For example, one pulse width may be more than 50% of the bit period (a majority fraction of the bit period). Similarly, a remaining second pulse width may be less than 50% of the bit period (a minority fraction of the bit period).

To perform the pulse-width modulation, each FSM may include or be associated with an oscillator such as a ring oscillator and one or more counters for counting the oscillations of the oscillator. At the beginning of a bit period, the counter begins counting the number of oscillations prior to the pulsing of the transmit pin/transmit line. Depending upon the pulse width for the transmitted pulse, the counter counts to either a first count or a second count that is greater than the first count. Upon completion of selected count (which depends upon the binary value for the transmitted bit), the FSM pulses the transmit line. For example, each processor may be configured to weakly charge its transmit line to a power supply voltage VDD when idle (no data frames being transmitted). Discharging the transmit line would then indicate the start of a transmitted bit in such an embodiment. More generally, each transmit line would be maintained in some default voltage state, which may be referred to as a first binary voltage. The start of a transmitted bit would then be identified by charging (or discharging) the transmit line to a second binary voltage. Depending upon the binary value of the corresponding bit in the transmit set, the FSM then maintains the transmit line at the second binary voltage for either the majority of the bit period or the minority of the bit period. In particular, if the corresponding bit in the transmit set has a first binary value, the counter counts to the first count. Conversely, if the corresponding bit in the transmit set has an opposite second binary value, the counter counts to the second count.

In one embodiment, the second binary value is a logical zero whereas the first binary value is a logical one. Similarly, the first binary voltage may equal the power supply voltage VDD whereas the second binary voltage may equal ground. In such an embodiment, the FSM then serially examines each bit in the transmit set and based upon their binary values, either pulses the transmit line with a relatively wide pulse or a relatively narrow pulse for each bit. The receiving FSM can then demodulate a received frame of data by determining the pulse widths. This determination may be performed on a bit-by-bit basis by counting the number of oscillations that occur while the receive line is discharged versus the number of oscillations that occur while the receive line is pulsed to the power supply voltage VDD.

Given this resulting pulse-width modulation and de-modulation for each frame of data sent from one processor to another, the integrated circuits require no common clock such that the transmission of a frame of data from one integrated circuit is entirely asynchronous with regard to its receipt at a remote integrated circuit. Since there need be no common clock, there is thus no need for a clock pin in each integrated circuit to receive the common clock. This then frees up the pin that might otherwise be preserved for the common clock for other uses. These advantageous features may be better appreciated by the following discussion of example embodiments.

Figure 1:
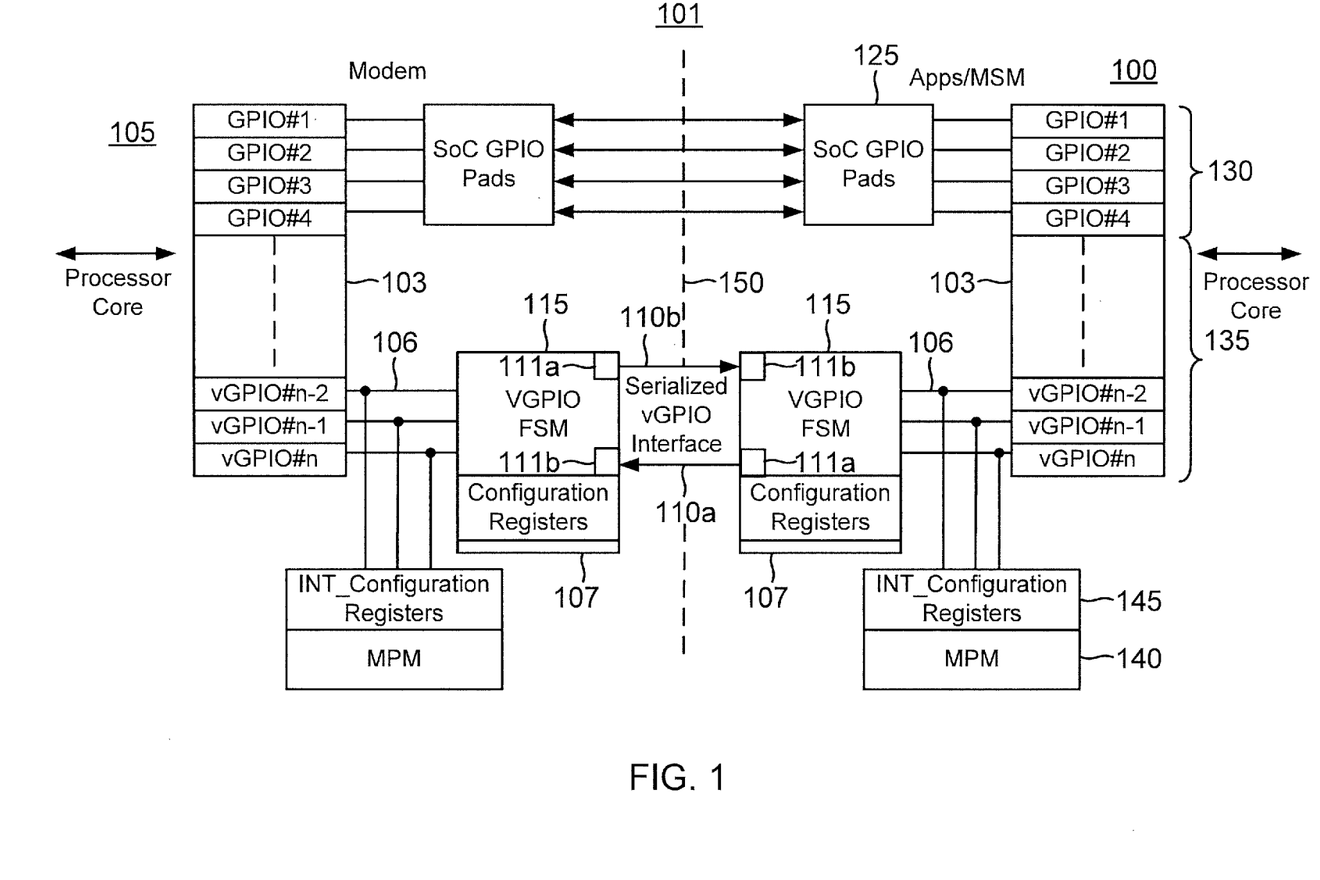
FIG. 1 is a block diagram of a system including a clockless virtual GPIO interface in accordance with an embodiment of the disclosure.

Turning now to the drawings, FIG. 1 illustrates a virtual GPIO architecture 101 that includes an application processor 100 and a modem processor 105. It will be appreciated, however, that other types of processors may be used within architecture 101. A transmit line 110a for transmitting virtual GPIO signals as IPC signals from application processor 100 over a transmit pin 111a is also the receive line for receiving these signals at modem processor 105 on a receive pin 111b. Similarly, a transmit line 110b for modem processor 105 for transmitting its IPC signals as virtual GPIO signals is also the receive line for application processor 100. These lines may be carried on a circuit board between the integrated circuits as indicated by dashed line 150. Each processor includes a transmit pin or pad (not illustrated) to couple to its transmit line. Similarly, each processor includes a receive pin or pad (not illustrated) to couple to its receive line. A finite state machine (FSM) 115 in each processor controls the transmission and reception of the virtual GPIO signals using these dedicated lines and pins.

As known in the GPIO arts, each processor includes a GPIO interface 103 over which it interfaces with GPIO pins. Advantageously, GPIO interface 103 may be unchanged with regard to the corresponding processor in virtual GPIO architecture 101. In other words, each processor receives and transmits signals'through its GPIO interface 103 in a conventional manner such that virtual GPIO architecture 101 is transparent to processors 100 and 105. A certain portion of the signals processed through each GPIO interface 103 may be transmitted and received on conventional GPIO pins 125 as GPIO signals 130. But a remaining portion of the signals processed through GPIO interface 103 are not transmitted or received through conventional GPT (pins or pads 125. Instead, this remaining portion of the signals processed through GPM interface 103 comprise a plurality of virtual GPIO signals 135 that are transmitted from FSM 115 over the dedicated transmit pin (or pad) 111a and received on the dedicated receive pin (or pad) 111b. The portion of the signals received at a GPIO interlace 103 from the corresponding processor that are processed as conventional GPIO signals 130 may be denoted herein as a first set of signals. Similarly, the remaining portion of the signals received at a GPIO interface 103 from the corresponding processor that are processed as virtual GPIO signals 135 may be denoted herein as a second set of signals. In contrast to conventional GPIO signals 130, each virtual GPIO signal 135 does not have its own dedicated pin but instead is multiplexed with the remaining virtual GPIO signals 135 on pins 111a and 111b. This is quite advantageous in that each processor core requires no retooling of its GPIO interface 103 yet virtual GPIO architecture 101 achieves a significant reduction of pins as compared to a conventional GPIO embodiment in which virtual GPIO signals 135 would each require their own pin.

Figure 2:
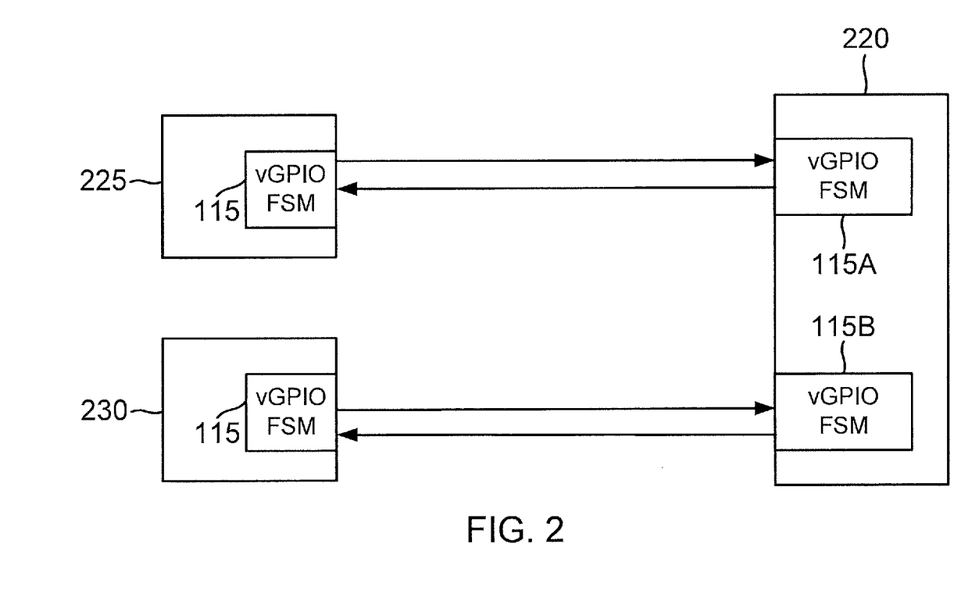
FIG. 2 is a high-level diagram for a virtual GPIO architecture in which a processor includes a pair of clockless virtual GPIO interfaces for communicating with two remote processors.

An integrated circuit such as processor 100 or modem 105 may include just one FSM 115 or may include a plurality of these elements for interfacing with multiple external systems. For example, FIG. 2 shows an application processor 220 interfacing with two modem processors 225 and 230 through two FSMs 115A and 115B, respectively, Each FSM 115A and 115B in processor 220 accommodates the virtual GPIO signaling with a corresponding one of the modem processors. In that regard, an integrated circuit such as an SOC may he configured with as many FSMs as is necessary to accommodate virtual GPIO signaling with assorted external processors. Regardless of the number of FSMs a processor may have, each FSM communicates using its own dedicated transmit pin 111a and a dedicated receive pin 111b as discussed with regard to FIG. 1. Because virtual GPIO signals 135 are accommodated using a finite state machine such as FSM 115, the processor cores may be asleep or in other types of dormant states yet be able to receive virtual GPIO signals 135. In this fashion, virtual GPIO architecture 101 not only advantageously economizes the number of pins for each GPIO interface 103 but is also low power.

As used herein, "pin" is a generic term to cover the structure such as a pad or an actual pin that an integrated circuit uses to couple to leads on circuit board or other physical interconnect (e.g., package interconnect or throughhole via interconnect). For example, if each integrated circuit has sixteen GPIO pins 125, then these pins could be configured to accommodate eight symmetric GPIO signals 130 (for illustration clarity, only four conventional GPIO signals #1 through #4 are shown in FIG. 1) or sixteen asymmetric GPIO signals 130. In addition, each integrated circuit can accommodate the input/output interfacing of a plurality of n virtual GPIO signals 135 using its transmit pin 111a and receive pin 111b, wherein n is an arbitrary plural integer. With regard to each processor core, there is no difference between GPIO signals 130 and virtual GPIO signals 135: they are both simply signals that are transmitted and received as necessary through GPIO interface 103. However, since virtual GPIO signals 135 do not have dedicated pins in contrast to conventional GPIO signals 130, virtual GPIO signals 135 are serialized in FSMs 115 for transmission on lines 110a and 110b. Upon reception, each FSM 115 deserializes the received serialized virtual GPIO signals. Thus, each FSM 115 functions as a serializer/deserializer with regard to virtual GPIO signals 135.

To identify the presence of received virtual GPIO signals 135 as transmitted from a remote processor, each processor may be configured to receive an interrupt signal in response to changes in selected ones of virtual GPIO signals 135. To provide the interrupt, a modem power manager (MPM) 140 monitors the selected virtual GPIO signals as programmed through interrupt (INT_configuration) registers 145. If MPM 140 sees a monitored signal change, it transmits an interrupt to its processor accordingly. With regard to transmission, each FSM 115 modulates the virtual GPIO signals 135 generated by its processor through the processor's interaction with the corresponding GPIO interface 103 into a pulse-width-modulated signal that is transmitted over transmit line 110a. Similarly, each FSM 115 receives a pulse-width-modulated signal on its receive line 110b from a remote processor. This pulse transmission is quite advantageous in that it enable asynchronous transmission (no common clock) between processors 100 and 105 as will be explained further herein.

Figure 3:
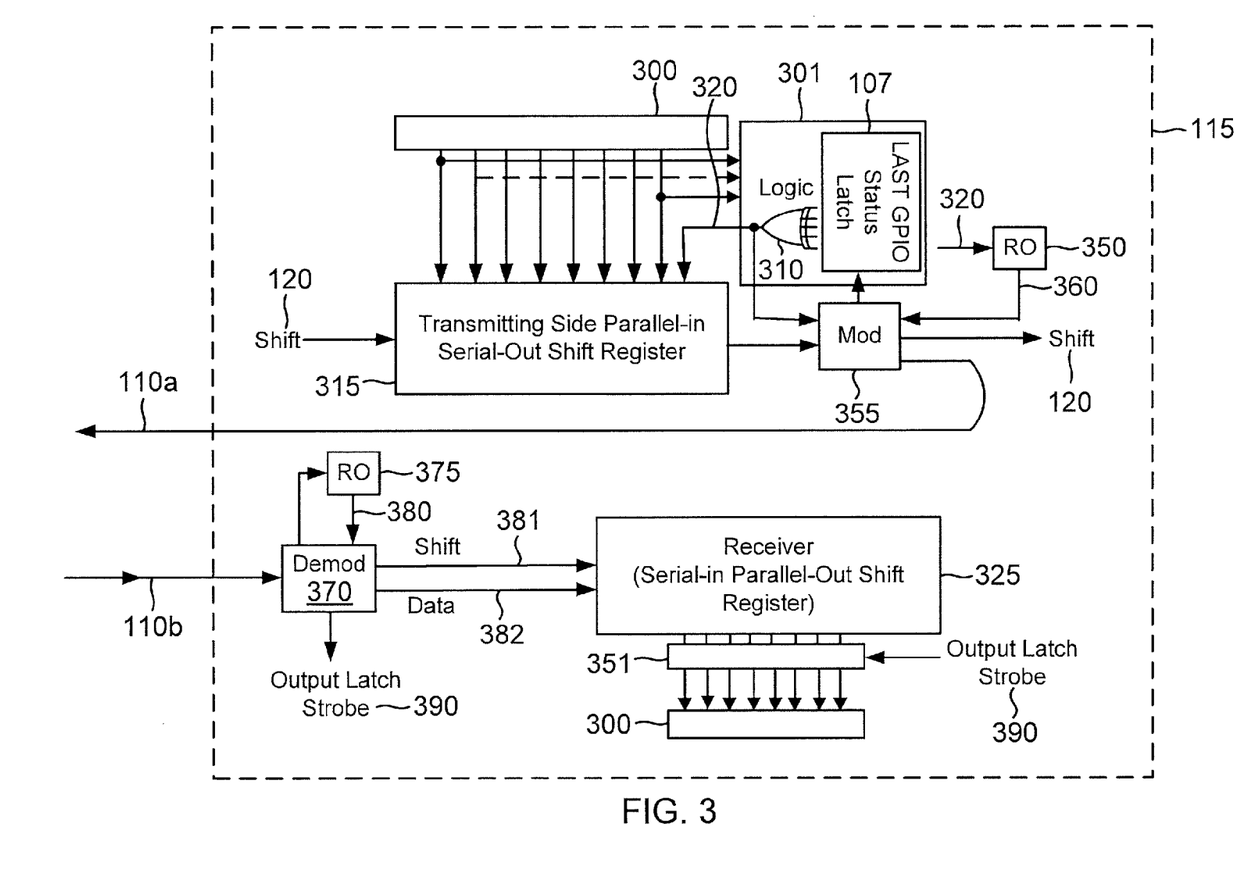
FIG. 3 is a block diagram for a finite state machine in the clockless virtual GPIO interface of FIG. 1.

FIG. 3 is a block diagram of an FSM 115 to better illustrate its transmit and receive operations. FSM 115 receives a transmit set of virtual GPIO signals from its GPIO interface 103 (shown in FIG. 1) through a multiplexing module 300. This transmit set of virtual GPIO signals would conventionally be transmitted as ordinary GPIO signals 130 discussed with regard to FIG. 1 but are instead identified as virtual GPIO signals 135 by GPIO interface 103 and processed through FSM 115 accordingly. FSM 115 includes a logic circuit 301 that will authorize the transmission of the transmit set of virtual GPIO signals as a pulse-width modulated signal over transmit line 110a if there has been a change in the transmit set as compared to a previous state of the transmit set. In this fashion, there is no unnecessary re-transmission of a transmit set that has not changed state as compared to a previous transmission. Logic circuit 301 thus compares the current transmit set of virtual GPIO signals to the previous transmit set stored in a latch or configuration register 107. To perform the comparison, logic circuit 301 may include an XOR gate 310 that XORs the current transmit set with the previous transmit set stored in configuration register 107 (this previous transmit set may be designated as the "LAST GPIO Status" as shown in FIG. 3), Multiplexing module 300 loads the current transmit set in parallel into a parallel-in-serial-out (PISO) shift register 315. If an enable signal 320 from XOR gate 310 goes high (indicating a change between the current transmit set and that stored in register 107), PISO shift register 315 is then enabled to serially shift out its contents onto transmit line 110a responsive to a shift signal 120.

Each transmit set of virtual GPIO signals 135 from FIG. 1 comprises a frame of data that is stored in PISO shift register 315. FSM 115 includes a pulse-width modulator 355 that pulse-width modulates the transmit set of bits shifted out from PISO shift register 315 into a pulse-width-modulated output signal that is driven to the remote processor on transmit line 110a. This modulation is responsive to counts of oscillation cycles from an oscillator such as the counts of a transmit ring oscillator output signal 360 from a transmit ring oscillator (RO) 350. Modulator 355 and transmit ring oscillator 350 may be triggered by the assertion of enable signal 320 from XOR gate 310. Responsive to this triggering, modulator 355 strobes shift signal 120 so that PISO shift register 315 shifts an initial bit of the transmit set of virtual GPIO signals to modulator 355.

Modulator 355 includes at least one counter (e.g., counters 405 and 410 shown in FIG. 4 described further below) that counts the cycles in ring oscillator output signal 360. Depending upon the desired pulse width from the pulse width modulation, the counter either counts to a first count or to a second count that is greater than the first count. After counting a sufficient number of cycles to satisfy the appropriate one of the first and second counts, the counter re-strobes shift signal 120 so that a subsequent bit from the frame of data stored in PISO shift register 315 is shifted into modulator 355. In this fashion, the transmit set of virtual GPIO signals 135 stored as a frame of data in PISO shift register 315 is shifted a bit at a time into modulator 355. Depending upon the binary value of each bit that is shifted out of PISO shift register 315, pulse-width modulator 355 pulse-width modulates a corresponding pulse transmitted over transmit line 110a. In that regard, processor 100 may be configured to weakly charge transmit line 110a high to a power supply voltage VDD during a default state (no data transmission). In such an embodiment, the pulse transmission for a bit time period begins with discharging transmit line 110a to ground (VSS) as shown in the timing diagram of FIG. 4 for a frame of data. Each pulse-width-modulated bit transmission begins with the discharging of transmit line 110a to ground by some initial discharge fraction of the bit period such as 25% of the bit time period. Depending upon the bit value, modulator 355 either maintains the discharge of transmit line 110a for a majority of the bit period (e.g., 75%) or charges transmit line 110a back to VDD immediately after expiration of the initial discharge fraction of the bit period. In other words, one binary value may be modulated into a relatively narrow pulse of high voltage (VDD) in a bit period whereas a complement of the binary value may be modulated into a relatively wide pulse of high voltage (VDD) in a bit period.

Figure 4:
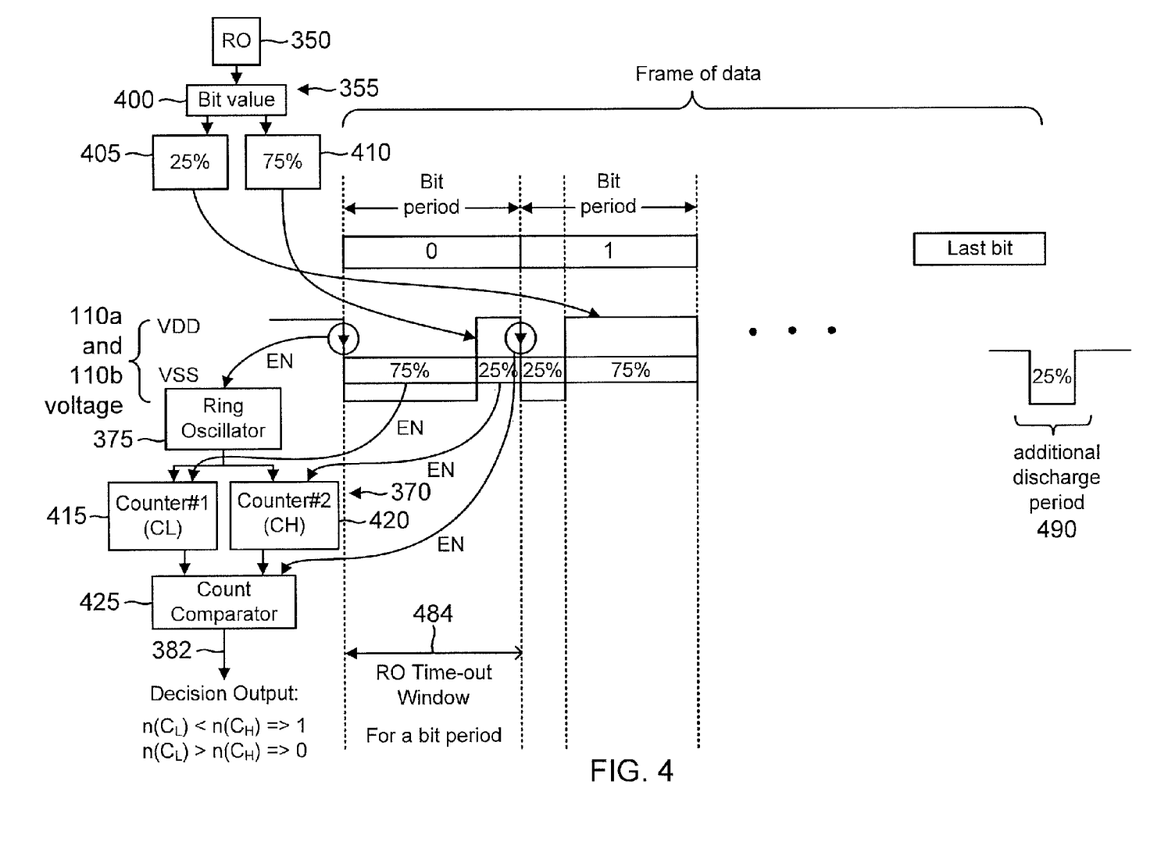
FIG. 4 is a timing diagram for the transmission of a frame of data in the system of FIG. 1.

The initial bit of the example data frame shown in FIG. 4 is a binary zero. In one embodiment, a binary zero may be modulated into a first pulse width in which transmit line 110a is maintained at ground for 75% of the bit period. Such a majority fraction of the bit period corresponds to a majority fraction counter 410 counting to the second count. If the bit to be transmitted is a binary zero, pulse-width modulator 355 would thus keep transmit line 110a discharged until the second count is satisfied. When the second count is reached, pulse-width modulator 355 would then pulse transmit line 110a to the power supply voltage VDD for the remainder of the bit period. This pulse duration would then correspond to a minority fraction counter 405 counting to the first count, which is just 25% of the bit period. The resulting voltage pulse transmitted over transmit line 110a for such a bit would then have a pulse width of just 25% of the bit period.

Conversely, a binary one may be modulated into a second pulse width in which transmit line 110a is grounded only during a minority discharge fraction such as the first 25% of the bit period. Transmit line 110a would then be discharged until the first count is satisfied. Once the first count is satisfied, pulse-width modulator 355 would then pulse transmit line 110a high to the power supply voltage VDD for the remainder of the bit period as determined by resetting majority fraction counter 410 to zero and counting until it satisfies the second count. The second pulse width during which the voltage for transmit line 110a is charged to the power supply voltage VDD would then comprise 75% of the bit period. It will appreciated, however, that different pulse widths may be used in alternative embodiment to signify the desired binary values. In some embodiments, after transmission of a last bit in the data frame, modulator 355 may then discharge transmit line 110a to ground (VSS) for an additional initial discharge fraction of the bit time period to signal the end of the data frame transmission. Such embodiments are useful if the transmitting and receiving FSMs 115 do not have a fixed number of bits for the transmitted data frames as will be discussed further herein.

In one embodiment, modulator 355 may comprise a logic circuit 400. Depending upon the bit value, logic circuit 400 either triggers minority fraction counter 405 or majority fraction counter 410 to begin counting. It will be appreciated, however, that a single counter may be used that counts to either the first or second count depending upon the desired pulse-width modulation. Upon triggering by logic circuit 400, minority fraction counter 405 or majority fraction counter 410 counts the cycles from transmit ring oscillator (RO) 350. For example, minority fraction counter 405 may be configured to count a sufficient number of cycles corresponding to 25% of the bit time period whereupon it asserts an output signal to signify that the first count is satisfied. Similarly, majority fraction counter 410 may be configured to count a sufficient number of cycles corresponding to 75% of the bit time period whereupon it asserts its output signal. in this embodiment, modulator 355 is configured to discharge transmit line 110a to ground at the start of each bit time period. Depending upon the bit value, modulator 355 will charge transmit line 110a back to the power supply voltage VDD upon on the assertion of the output signal from the appropriate counter. For example, the first bit in the data frame is a binary zero so modulator 355 asserts transmit line 110a high to VDD upon counter 410 asserting its output signal. Similarly, the second bit in the data frame is a binary one so modulator 355 asserts transmit line 110*a* high to VDD upon counter 405 asserting its output signal. It will be appreciated that initial 25% low period is just an example and that other fractions of the bit time period may be implemented.

In one embodiment, the combination of logic circuit 400, counters 405 and 410, modulator 355, and SIPO shift register 315 may be deemed to comprise a means for serially processing each signal in the transmit set into a series of corresponding pulse-width-modulated signals, wherein the means is configured to determine a pulse width for each serially processed signal by counting oscillations from an oscillator into one of a first count and a second count responsive to a binary value of the serially processed signal, and wherein the means is further configured to transmit the series of corresponding pulse-width-modulated signals through a dedicated transmit pin to a remote processor over the dedicated transmit pin.

Referring again to FIG. 3, FSM 115 also deserializes a receive set of virtual GPIO signals in an analogous fashion using a serial-in-parallel-out (SIPO) shift register 325. A demodulator 370 demodulates a received pulse-width-modulated signal from a remote processor as received on receive line 110*b*. Demodulator 370 is configured to detect the start of a received frame of data from the received pulse-width-modulated signal such as by detecting the discharge of receive line 110*b* to trigger a receive ring oscillator 375 to begin oscillating a receive ring oscillator output signal 380 (illustrated in FIG. 3). Note that in alternative embodiments, oscillators 375 and 350 may comprise the same oscillator. Analogous to modulator 355, demodulator 370 may include a counter such as a low counter 415 and a high counter 420. In each bit period, low counter 415 is triggered to count while receive line 110*b* is discharged. Conversely, high counter 420 is triggered to count while receive line 110*b* is charged to the power supply voltage VDD. In alternative embodiments, counters 415 and 420 may be implemented using a single common counter that counts the number of oscillations in each binary voltage state for receive line 110*b*. By comparing the counts from counters 415 and 420, demodulator 370 may form a demodulated data signal 382 accordingly. In particular, if the count from high counter 420 is greater than the count from low counter 415 in a given bit period, demodulator 370 may drive demodulated data signal 382 high to the power supply voltage VDD to signify that a relatively wide pulse was received. Conversely, if the count from low counter 415 is greater, demodulator 370 may discharge demodulated data signal 382 to VSS to signify that a relatively narrow pulse was received.

Demodulator 370 may also assert a shift signal 381 to SIPO shift register 325 upon detection from the counts of the bit time period boundaries. SIPO shift register 325 would then shift in demodulated data signal 382 from demodulator 370. FSM module 115 may be configured to process a predefined data frame size for the transmit and receive sets of virtual GPIO signals—for example, each set may comprise a plurality n of virtual GPIO signals. The n virtual GPIO signals are transmitted and received in a frame with respect to a start bit and a stop bit. FSM 115 is readily programmed to alter this predefined set size as necessary for a given design. The start bit is the initial bit in a data frame. The stop bit is the final bit in a data frame and may be followed by an additional discharge fraction of the bit period.

Both counters 415 and 420 are initialized at the start of a bit time period. Low counter 415 counts the cycles from receive ring oscillator 375 while the receive line 110*b* voltage is low whereas high counter 420 counts the cycles from receive ring oscillator 375 while receive line voltage is high (VDD). Comparator 425 thus performs the demodulation bit decision at the end of each bit time period by comparing a low count ($C_L$) from low counter 415 to a high count ($C_H$) from high counter 420. The bit periods may be determined from whenever high counter 420 stops counting and outputs $C_H$ as triggered by receive line 110*b* being discharged. Counter 420 may be initialized at each bit time boundary accordingly. At the end of each bit period, if $C_L$ is greater than $C_H$, comparator 425 drives demodulated data signal 382 low, corresponding to the demodulation of a binary zero in one embodiment. Conversely, if $C_H$ is greater than $C_L$ at the end of a bit period, comparator drives demodulated data signal 382 high, corresponding to the demodulation of a binary one in such an embodiment. SIPO shift register 325 registers each demodulated bit decision responsive to a strobe of shift signal 381.

As discussed previously, each FSM 115 for the receiving and transmitting processors may be configured to receive a known number of bits from each transmit frame of data. In such fixed frame size embodiments, there is no need for an end of frame marker because the frame size is already known to each FSM 115. In the fixed frame size embodiments, each FSM 115 may be configured to declare a data frame transmission as invalid if the receive line 110*b* voltage does not return to VDD in a bit time out period 484 corresponding to a bit time period. As shown in FIG. 4, if demodulator 370 does not detect a return of the receive line 110*b* voltage to VDD in bit time out period 484, the corresponding transmitting processor may be assumed to be faulty. Bit time out period 484 is initialized at the start of each bit period and has a length at least as long as the bit period.

Figure 5:
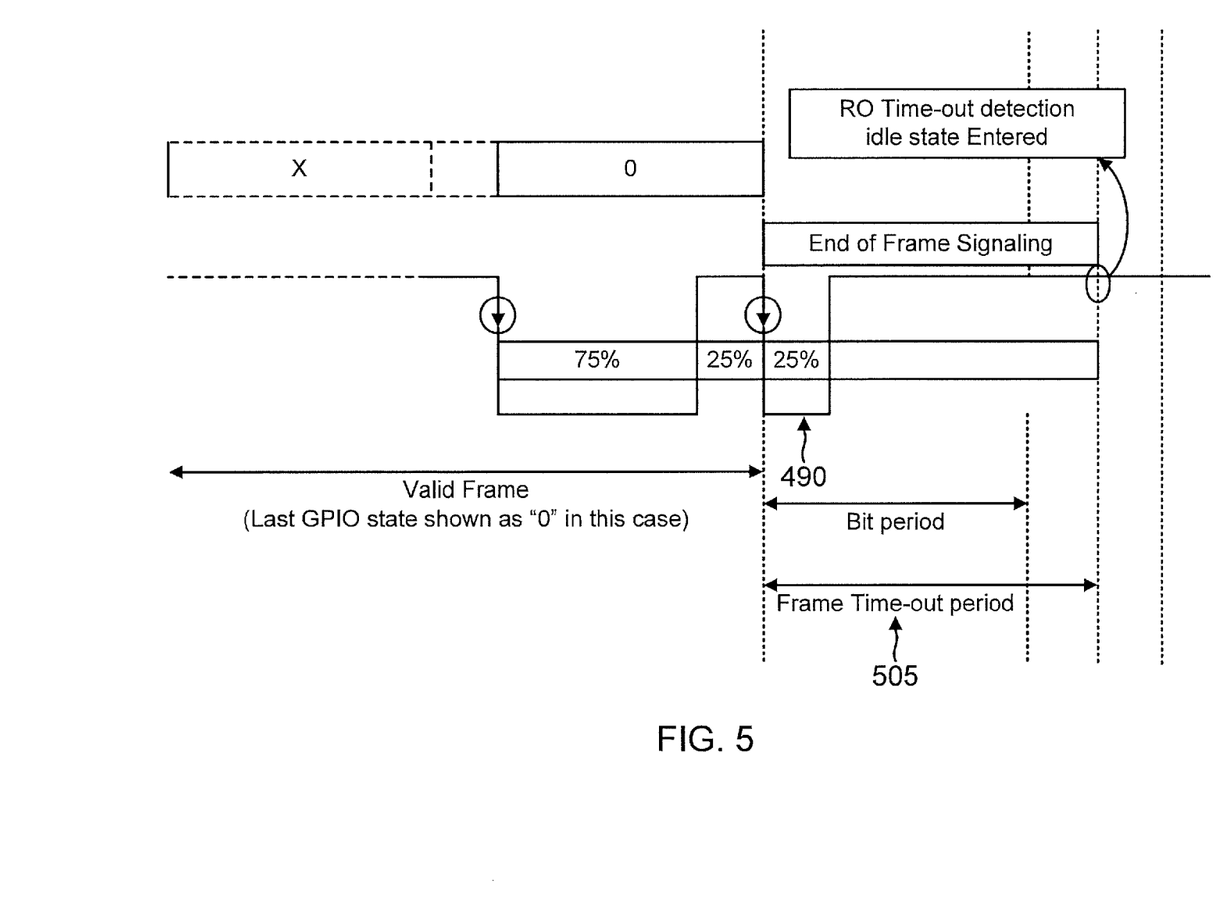
FIG. 5 is a timing diagram for the end of frame signaling in the system of FIG. 1.

In alternative embodiments, the frame size may vary as opposed to be being fixed. The end of a data frame transmission may then be demarcated by an additional discharge period 490 such as by pulling the transmit line 110*a* low for 25% of a bit period. But note that there is no additional bit being transmitted in conjunction with the transmission of additional discharge period 490. Each processor (or FSM) may be configured to weakly charge its transmit line 110*a* to the power supply voltage VDD so that the transmit line voltage would return to VDD after additional discharge period 490. Because the additional discharge period 490 denotes the end of the frame, the transmitting FSM 115 does not pull its transmitting line voltage low within a bit time period after the start of the additional initial discharge period. FIG. 5 again illustrates additional discharge period 490 at the end of a valid frame transmission. The receiving FSM (not illustrated) begins a frame time out period 505 whenever its receive line is discharged. The receiving FSM would thus be triggered to begin a frame time out period at the start of additional discharge period 490. Frame time out period 505 is longer than the bit period. For example, frame time out period 505 may equal 1.25 times the bit period. If a data frame is valid, the voltage for the receive line in the receiving FSM remains at the power supply voltage VDD at the end of frame time out period 505. Conversely, if the receiving line voltage is low at the end of frame time out period 505, the receiving FSM determines that a valid frame has not been transmitted. The health of a remote processor will thus be transparent to a given processor regardless of whether the frame size is fixed or variable. A method of operation for transmitting a virtual GPIO frame will now be discussed.

Figure 6:
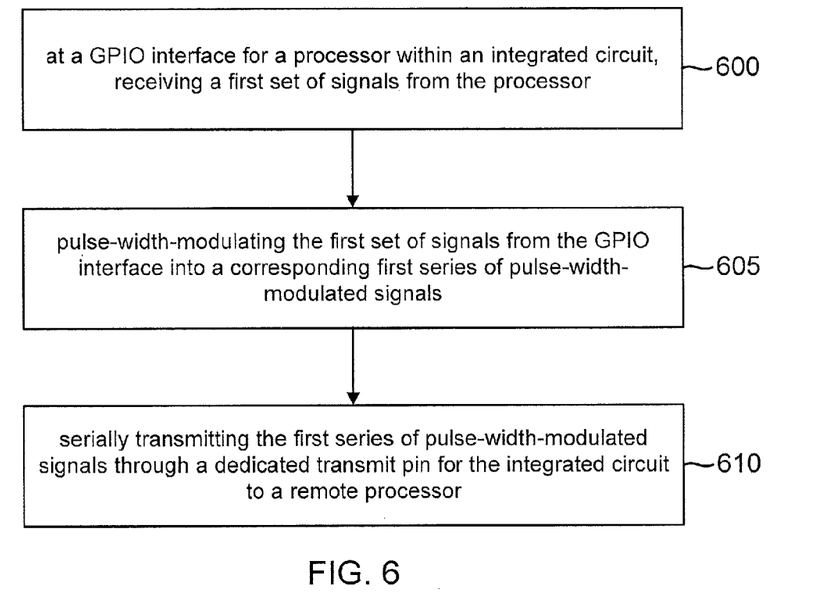
FIG. 6 is a flowchart of an example method of operation for the finite state machine of FIG. 3.

FIG. 6 is a flowchart for a method of transmitting a virtual GPIO frame of data. The method includes an act 600 of receiving, at a GPIO interface for a processor within an integrated circuit, a first set of signals from the processor. The receipt of a transmit set of virtual GPIO signals 135 at GPIO interface 115 as discussed with regard to FIG. 1 is an example of act 600. The method also includes an act 605 of pulse-width-modulating the first set of signals from the GPIO interface into a corresponding first series of pulse-width-modulated signals. The shifting of the transmit set from SIPO shift register 315 to modulator 355 as discussed with regard to FIGS. 3 and 4 is an example of act 605. Finally, the method includes an act 610 that comprises serially transmitting the first series of pulse-width-modulated signals through a dedicated transmit pin for the integrated circuit to a remote processor. The transmission through dedicated transmit pin 111a as discussed with regard to FIG. 1 is an example of act 610.

Consider the advantages of the virtual GPIO architectures discussed herein: only two pins for each virtual GPIO FSM are necessary yet any number of virtual GPIO signals can be serialized and deserialized through the virtual GPIO FSMs. Moreover, transmitting and receiving FSM may be asynchronous with regard to each other in that no common clock source is necessary in that each FSM modulates and demodulates the virtual GPIO data using a ring oscillator as discussed herein. There is thus no need for a common clock pin to synchronize the virtual GPIO frames. Moreover, no other pins are necessary to make the health of one processor transparent to the opposing processor.

As those of some skill in this art will by now appreciate and depending on the particular application at hand, many modifications, substitutions and variations can be made in and to the materials, apparatus, configurations and methods of use of the devices of the present disclosure without departing from the spirit and scope thereof. In light of this, the scope of the present disclosure should not be limited to that of the particular embodiments illustrated and described herein, as they are merely by way of some examples thereof, but rather, should be fully commensurate with that of the claims appended hereafter and their functional equivalents.

We claim:

1. An integrated circuit, comprising:
a plurality of GPIO pins:
a GPIO interface configured to receive a first set of signals from a processor and to provide a GPIO portion of the first set of signals to the plurality of GPIO pins for transmission to a remote processor as GPIO signals;
a dedicated transmit pin; and
a finite state machine (FSM) configured to receive a virtual GPIO portion of the first set of signals from the GPIO interface as a transmit set of virtual GPIO signals and to serially transmit the transmit set of virtual GPIO signals as a series of corresponding pulse-width-modulated signals to a remote processor over the dedicated transmit pin, wherein the FSM includes a oscillator and at least one counter configured to count oscillations from the oscillator, and wherein the FSM is further configured to determine a pulse width for each pulse-width-modulated signal responsive to a count from the at least one counter, and wherein the FSM is further configured to generate each pulse-width-modulated signal such that a first binary value for the corresponding virtual GPIO signal in the transmit set corresponds to the generation of a first pulse width for the pulse-width-modulated signal and such that an opposite second binary value for the corresponding virtual GPIO signal in the transmit set corresponds to the generation of a second pulse width for the pulse-width-modulated signal, and wherein the second pulse width is greater than the first pulse width.

2. The integrated circuit of claim 1, wherein the oscillator is a ring oscillator.

3. The integrated circuit of claim 1, further comprising a dedicated receive pin, the FSM being further configured to serially receive pulse-width-modulated signals from the remote processor over the dedicated receive pin and to demodulate the received pulse-width-modulated signals into a receive set of virtual GPIO signals.

4. The integrated circuit of claim 3, wherein the GPIO interface is further configured to provide the receive set of virtual GPIO signals to the processor.

5. The integrated circuit of claim 3, wherein the FSM further includes a receive oscillator and a demodulator, and wherein the demodulator is configured to demodulate the received pulse-width-modulated signal responsive to a count of cycles from the receive oscillator.

6. The integrated circuit of claim 5, wherein the receive oscillator is a receive ring oscillator.

7. The integrated circuit of claim 6, wherein the demodulator includes a high counter configured to count the cycles for the receive ring oscillator in a hit period for a current one of the received pulse-width-modulated signals while the current received pulse-width-modulated signal equals a power supply voltage VDD to provide a high count and includes a low counter configured to count the cycles for the receive ring oscillator in the bit period while the current received pulse-width-modulated signal equals ground to provide a low count.

8. The integrated circuit of claim 5, wherein the demodulator further includes a comparator to compare the high count to the low count to make a bit demodulation decision for each bit period in the received pulse-width-modulated signals.

9. The integrated circuit of claim 1, wherein the integrated circuit is configured to weakly charge the dedicated transmit pin to a power supply voltage VDD during an idle mode, and wherein the FSM is configured to transmit the pulse-width-modulated signals as a frame of data that begins with a discharge of the dedicated transmit pin.

10. The integrated circuit of claim 9, wherein the FSM is farther configured to discharge the dedicated transmit pin at an end of the frame of data for an additional discharge period.

11. The integrated circuit of claim 3, wherein the integrated circuit is configured to weakly charge the dedicated receive pin to a power supply voltage VDD during an idle mode, and wherein the FSM is further configured to detect an end of a frame of data in the received pulse-width-modulated signals by detecting an additional discharge period for the dedicated receive pin that is not followed by any further discharges of the dedicated receive pin within a frame time-out period.

12. The integrated circuit of claim 11, wherein the frame time-out period is greater than a bit period for the frame of data.

13. A method, comprising:
at a GPIO interface for a processor within an integrated circuit, receiving a first set of signals from the processor;
pulse-width-modulating the first set of signals from the GPIO interface into a corresponding first series of pulse-width-modulated signals;

serially transmitting the first series of pulse-width-modulated signals through a dedicated transmit pin for the integrated circuit to a remote processor;

through a dedicated receive pin for the integrated circuit, serially receiving a second series of pulse-width-modulated signals from the remote processor;

demodulating the received second series of pulse-width-modulated signals into a corresponding receive set of virtual GPIO signals;

providing the receive set of virtual GPIO signals in parallel to the GPIO interface; and from the GPIO interface, providing the receive set of virtual GPIO signals in parallel to the processor as a second set of signals.

14. The method of claim 13, further comprising:

at the GPIO interface, receiving a second set of signals from the processor; and transmitting the second set of signals received at the GPIO interface through a plurality of GPIO pins for the integrated circuit to the remote processor.

15. The method of claim 13, wherein demodulating each received pulse-width-modulated signal comprises:

counting oscillations from an oscillator while the received pulse-width-modulated signal has a first voltage to form a first count;

counting oscillations from the oscillator while the received pulse-width-modulated signal has a second voltage to form a second count;

demodulating the received pulse-width-modulated signal into a received virtual GPIO signal having a first binary value responsive to the first count being greater than the second count; and demodulating the received pulse-width-modulated signal into a received virtual GPIO signal having an opposite second binary value responsive to the second count being greater than the first count.

16. The method of claim 13, wherein pulse-width-modulating the first set of signals into the corresponding first series of pulse-width-modulated signals comprises:

serially processing each signal in the first set of signals by determining whether the signal has a first binary value or an opposite second binary value; and when the processed signal has the first binary value, generating the corresponding pulse-width-modulated signal by discharging the dedicated transmit pin to ground for a first duration according to a first count of oscillations from an oscillator and then charging the dedicated transmit pin to a power supply voltage VDD for a second duration according to a second count of oscillations from the oscillator, wherein the second duration is greater than the first duration.

17. The method of claim 16, wherein pulse-width-modulating the first set of signals into the corresponding first series of pulse-width-modulated signals further comprises:

when the processed signal has the second binary value, generating the corresponding pulse-width-modulated signal by discharging the dedicated transmit pin to ground for the second duration and then charging the dedicated transmit pin to the power supply voltage VDD for the first duration.

18. An integrated circuit, comprising:

a plurality of GPIO pins:

a GPIO interface configured to receive a first set of signals from a. processor within the integrated circuit and to provide a GPIO portion of the first set of signals to the GPIO pins for transmission to a remote processor as GPIO signals;

a dedicated transmit pin; and an oscillator;

means for receiving a virtual GPIO portion of the first set of signals from the GPIO interface as a transmit set of virtual GPIO signals and for serially processing the transmit set of GPIO signals as a series of corresponding pulse-width-modulated signals, wherein the means is configured to determine a pulse width for each pulse-width-modulated signal by counting oscillations from the oscillator into one of a first count and a second count responsive to a binary value of the corresponding virtual GPIO signal, and wherein the means is further configured to transmit the series of corresponding pulse-width-modulated signals through the dedicated transmit pin to a remote processor over the dedicated transmit pin, wherein the means includes at least one counter configured to count oscillations from the oscillator, and wherein the means is further configured to determine the pulse width for each pulse-width-modulated signal responsive to a count from the at least one counter, and wherein the means is further configured to generate each pulse-width-modulated signal such that a first binary value for the corresponding virtual GPIO signal in the transmit set corresponds to the generation of a first pulse width for the pulse-width-modulated signal and such that an opposite second binary value for the corresponding virtual GPIO signal in the transmit set corresponds to the generation of a second pulse width for the pulse-width-modulated signal, and wherein the second pulse width is greater than the first pulse width.

19. The integrated circuit of claim 18, wherein the oscillator comprises a ring oscillator.

20. The integrated circuit of claim 18, wherein the first count is greater than the second count.

* * * * *